(12) United States Patent  
Sugano et al.

(10) Patent No.: US 6,397,968 B2  
(45) Date of Patent: Jun. 4, 2002

(54) TRANSMISSION UNIT FOR HYBRID VEHICLE

(75) Inventors: Taku Sugano, Shizuoka; Sachiyo Hasegawa, Kanagawa, both of (JP)

(73) Assignee: Jatco Transtechnology Ltd., Fuji (JP)

( * ) Notice: Subject to any disclaimer, the term of this patent is extended or adjusted under 35 U.S.C. 154(b) by 0 days.

(21) Appl. No.: 09/785,485

(22) Filed: Feb. 20, 2001

(30) Foreign Application Priority Data

Mar. 22, 2000 (JP) .................................... 2000-079528

(51) Int. Cl.$^7$ ............................................. B60K 17/00
(52) U.S. Cl. ....................................................... 180/339
(58) Field of Search ........................... 180/339, 68.1; 165/41, 46, 57, 51, 916, 168, 169, DIG. 4; 310/52, 54, 113

(56) References Cited

U.S. PATENT DOCUMENTS 4,837,469 A * 6/1989 Ward ............................ 310/53

FOREIGN PATENT DOCUMENTS

| JP | 9-329228 | 12/1997 |
| JP | 2000-9213 | 1/2000 |

OTHER PUBLICATIONS

U.S. application No. 09/785,454, Sugano, filed Feb. 20, 2001.
U.S. application No. 09/785,455, Hasegawa, filed Feb. 20, 2001.
U.S. application No. 09/785,483, Sugano, filed Feb. 20, 2001.
U.S. application No. 09/785,484, Sugano, filed Feb. 20, 2001.

* cited by examiner

*Primary Examiner*—Paul N. Dickson
*Assistant Examiner*—C. T Bartz
(74) *Attorney, Agent, or Firm*—Foley & Lardner (57) ABSTRACT

A transmission unit for a hybrid vehicle includes a housing formed with a water jacket for cooling a stator of a motor. The water jacket includes a hollow annular passage having a water inlet and a water outlet. The water jacket has at least one uneven or depressed portion for avoiding an adjacent component. At the uneven portion, the cross sectional shape of the flow passage is varied gradually and smoothly so that the cross-sectional area of the flow passage remains constant. The water jacket further includes an inflow passage extending in a tangential direction to the water inlet, and an outflow passage extending in a radial direction from the water outlet.

10 Claims, 8 Drawing Sheets

TRANSMISSION UNIT FOR HYBRID VEHICLE

BACKGROUND OF THE INVENTION

The present invention relates to a transmission unit to be installed in a hybrid vehicle combining an engine and a motor, to obtain a driving force.

With improved fuel economy and lower emissions, hybrid vehicles benefit conservation of global environment and savings of limited resources. In a hybrid vehicle, a motor is arranged in series or parallel to an engine to assist the engine and to serve as a generator for converting kinetic energy of the vehicle to electrical energy on deceleration.

Figure 7A:
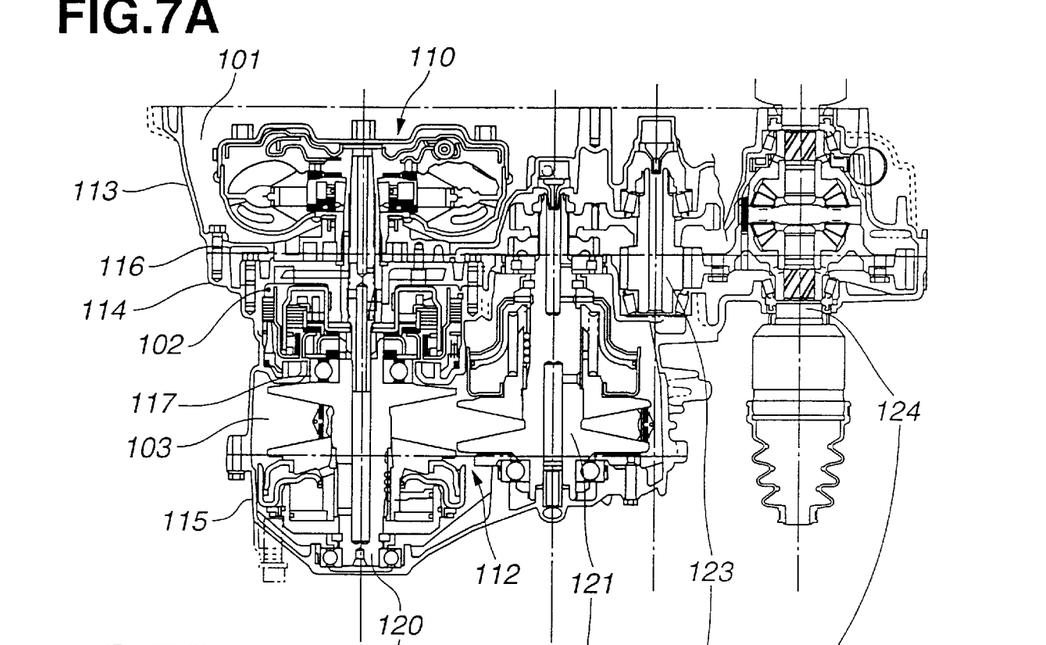
FIGS. 7A and 7B are sectional views for comparing a conventional transmission unit with a transmission unit modified for a hybrid vehicle.

A published Japanese patent application Publication (Kokai) No. 9(1997)-329228 shows a conventional transmission having a planetary gear system. This transmission is designed to add a motor without changing the basic layout of a conventional transmission to reduce the manufacturing cost. The transmission of this example includes, as shown in FIG. 7A, a torque converter chamber 101 defined by a first housing 113 and a first partition 116, a planetary gear chamber 102 defined by a second housing 114, the first partition 116 and a second partition 117, and a transmission chamber 103 defined by a third housing 115 and the second partition 117. Rotation from the engine is inputted to a torque converter 110 in the torque converter chamber 101, the output from the torque converter 110 is inputted:the planetary gear system in the planetary gear chamber 102 and further to a transmission 112 in the transmission chamber 103.

When a motor is disposed in the planetary gear chamber without changing the basic layout, a water jacket formed around the motor is effective to cool the motor having the coil heated by repetition of drive and generation.

A published Japanese patent application Publication (Kokai) No. 2000-9213 shows an apparatus having an electromagnetic clutch in the torque converter chamber 101 and a motor in the planetary gear chamber 102, as shown in FIG. 7A.

SUMMARY OF THE INVENTION

Figure 7B:
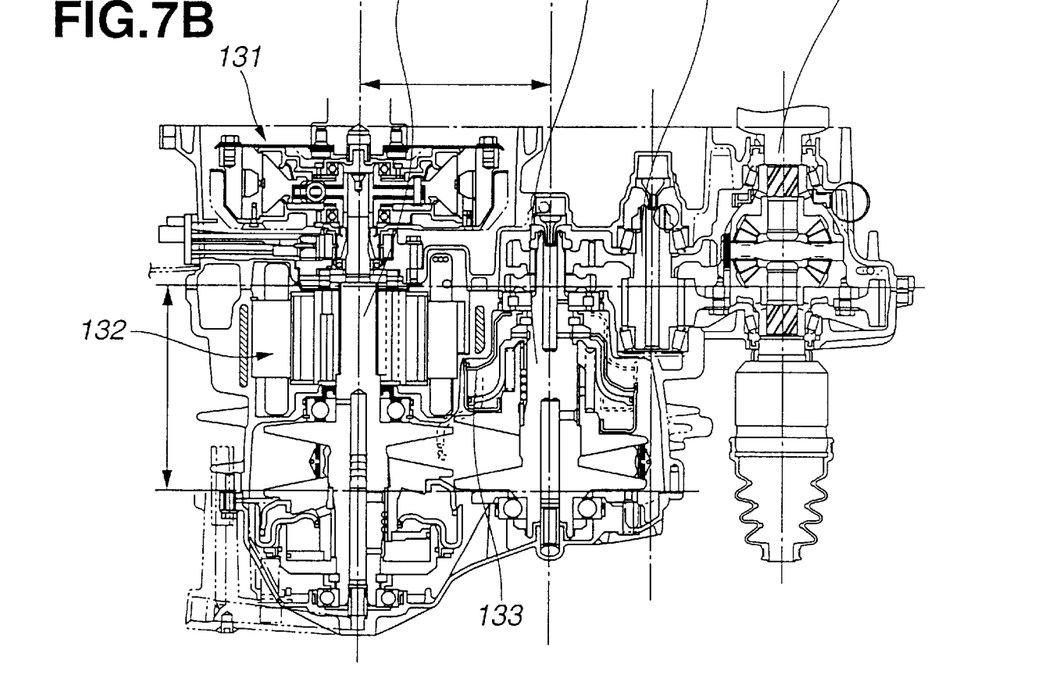
Figure 8:
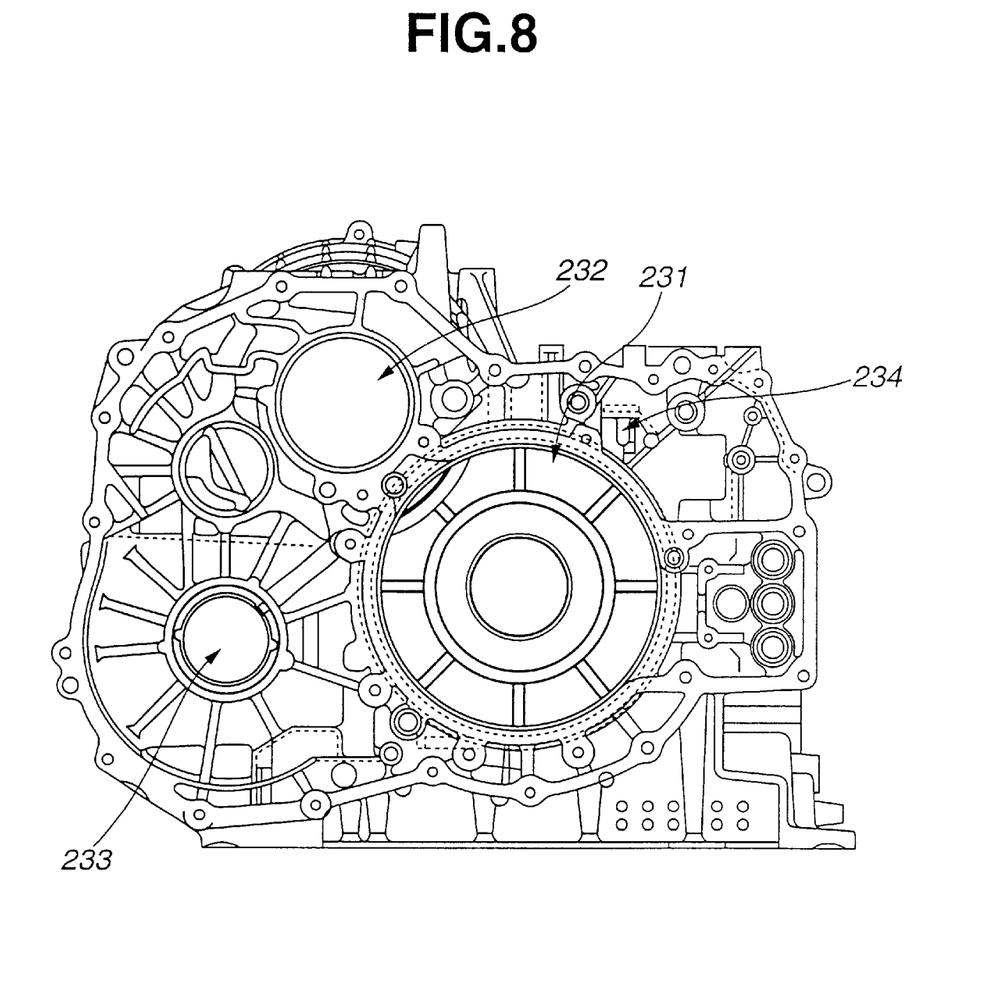
FIG. 8 is a front view of a housing of the transmission unit of FIG. 7B.

However, the space for the water jacket is limited because, as shown in FIGS. 7A and 7B, a transmission input shaft 120, a driven shaft 121, an idler shaft 123 and a differential 124 are arranged with proper distances between adjacent axes. FIG. 8 shows a front view of the housing of the transmission unit of FIG. 7B. As shown in FIG. 8, a motor receiving: portion 231 for receiving the motor is surrounded by a driven pulley receiving portion 232 for a driven pulley, a differential receiving portion 233 for a differential, and a parking support receiving portion 234 for a parking pole support.

An object of the present invention is to provide a transmission unit for a hybrid vehicle, having a water jacket to cool a motor efficiently. Another object is to provide a transmission unit in which a water jacket is formed compactly without the need for changing a layout of a conventional design. Still another object is to provide an annular water jacket designed to improve the cooling performance by holding the flow rate uniform all round the circumference.

According to the present invention, a transmission unit for a hybrid vehicle, the transmission unit comprises a unit housing which comprises;

a first section (such as an item 42) defining a clutch chamber for containing an electromagnetic clutch;

a second section (such as an item 41a) defining a transmission chamber for containing a transmission; and a third -section (such as an item 41b) defining a motor chamber for containing a motor comprising a rotor and a stator, and a water jacket for circulation of water to cool the stator.

The water jacket comprises an annular passage extending around the motor chamber, and comprising a water inlet for introducing the coolant into the annular passage, a water outlet for discharging the coolant from the annular passage, and a depressed or uneven portion which is depressed to form a space for receiving an adjacent component of the transmission unit, and which has a cross sectional shape varied gradually so that a flow sectional area remains uniform.

DETAILED DESCRIPTION OF THE INVENTION

The following is explanation on one embodiment according to the present invention, based on the drawings.

Figure 1:
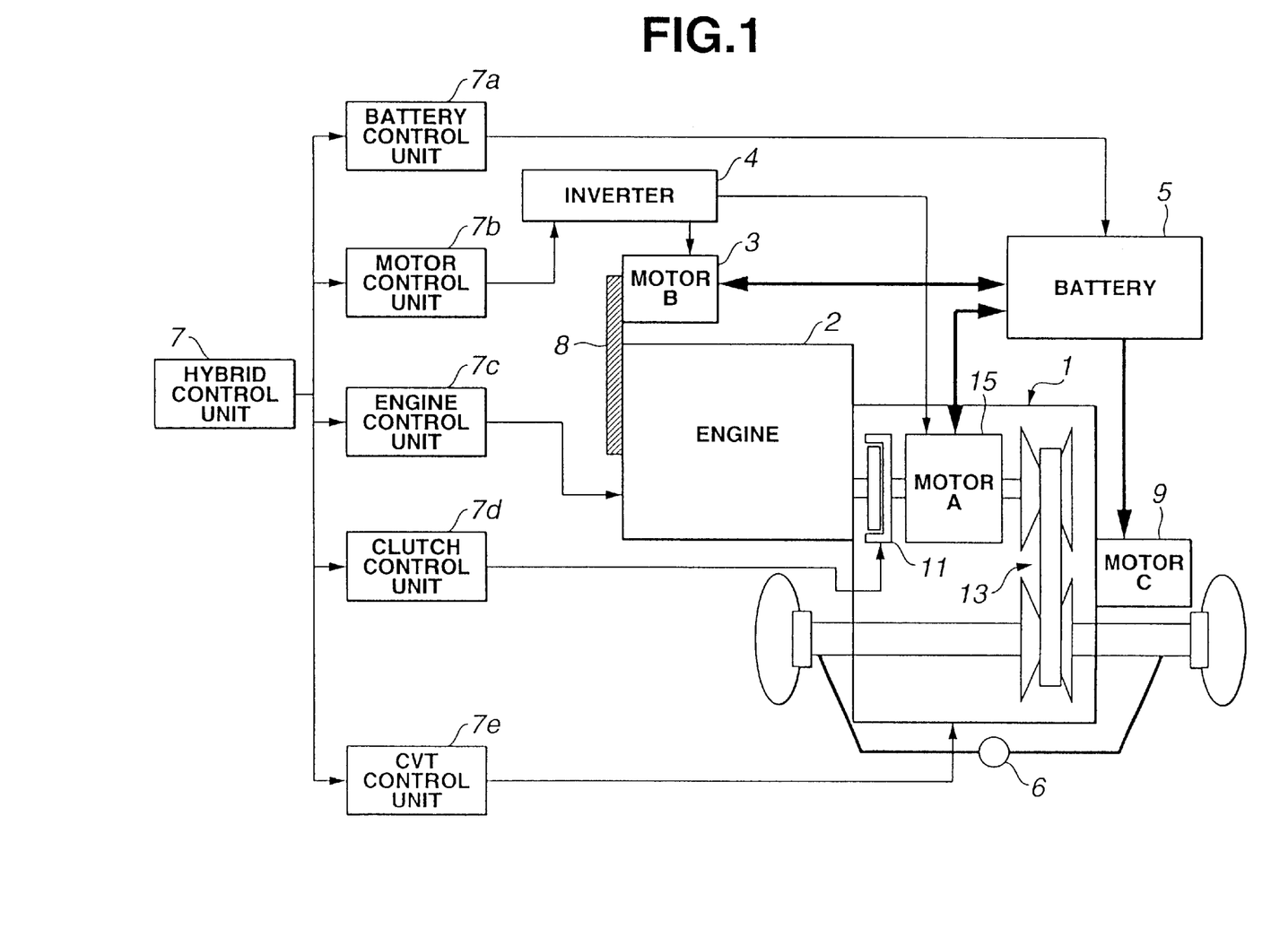
FIG. 1 is a schematic view showing a hybrid drive system of a hybrid vehicle according to one embodiment of the present invention.

The drive system shown in FIG. 1 includes a transmission unit 1, an engine 2, a B motor 3 for acting as a generator/starter, an inverter 4, a battery 5, an electric power steering 6, a hybrid control unit 7, and a chain 8.

In the transmission unit 1, there are provided an electromagnetic clutch 11, an A motor 15 for acting as a driving motor, and a continuously variable transmission (CVT) 13. The A motor 15 also acts as a regenerative motor for regeneration of energy during deceleration and braking. A C motor 9 is for driving an electric oil pump. The C motor 9 can drive the oil pump properly even in a motor drive mode in which the vehicle is driven only by the motor and the engine cannot supply sufficient power to drive the oil pump (especially to obtain a pulley pressure of the CVT 13). For the same reason, the power steering 6 is assisted by the motor.

The B motor 3 serving as generator/starter is mounted on the engine block and connected with the engine 2 through the chain 8. The B motor 3 acts as a generator in normal operation, and acts as a starter in a starting operation. Control units 7a, 7b, 7c, 7d, and 7e, for the battery 5, motors 3 and 15, engine 2, clutch 11 and CVT 13 are controlled in an integrated manner by the hybrid control unit 7.

The hybrid drive system is operated as follows. The hybrid drive system in the embodiment is a parallel type. The A motor 15 assists the engine 2 which is fuel economy oriented rather than output. The CVT 13 also acts as a coordinator so that the engine operates at the optimum fuel consumption point. The clutch 11 is an electromagnetic clutch. When the clutch is in OFF state, the vehicle is operated only by the A motor 15. The clutch control unit 7d, controls the ON/OFF state of the clutch 11 automatically and optimally under the command of the hybrid control unit 7.

<Starting up the System>

When starting up the system, the B motor 3 functions as a starter to start the engine 2.

<Starting/Low-speed Operation>

In a starting operation or a low-speed operation at low load where the fuel consumption rate of the engine 2 is low, the engine 2 stops and the vehicle is driven only by the A motor 15. If the load is heavy (the throttle opening is large), the engine 2 starts up immediately, the clutch 11 turns on, and the vehicle is driven by both the engine 2 and the A motor 15.

<Normal Running Operation>

The vehicle runs mainly by the engine 2. In this case, the operation on the best fuel consumption line is achieved by adjusting the engine speed under the shift control of the CVT 13.

<At heavy loads>

During operation in a heavy load region where the driving force is deficient even if the engine 2 generates the maximum output, electrical energy is supplied from the battery 5 to the A motor 15 actively to enhance the whole driving force.

<Decelerating>

When the vehicle is decelerated, the supply of fuel to the engine 2 is cut off. Simultaneously, the A motor 15 functions as a generator to convert a part of kinetic energy to electrical energy and store the electrical energy in the battery 5. Thus, kinetic energy that used to be thrown away is recovered.

<Reverse Operation>

A reverse gear is not provided in the CVT 13. Therefore, to operate the vehicle in reverse, the clutch 11 is opened and the A motor 15 is rotated in the reverse direction. The vehicle is driven only by the A motor 15.

<Stopping>

When the vehicle is stopped, the engine 2 stops except for the case of need to charge the battery 5, to operate the air compressor, or for warming-up.

Figure 2:
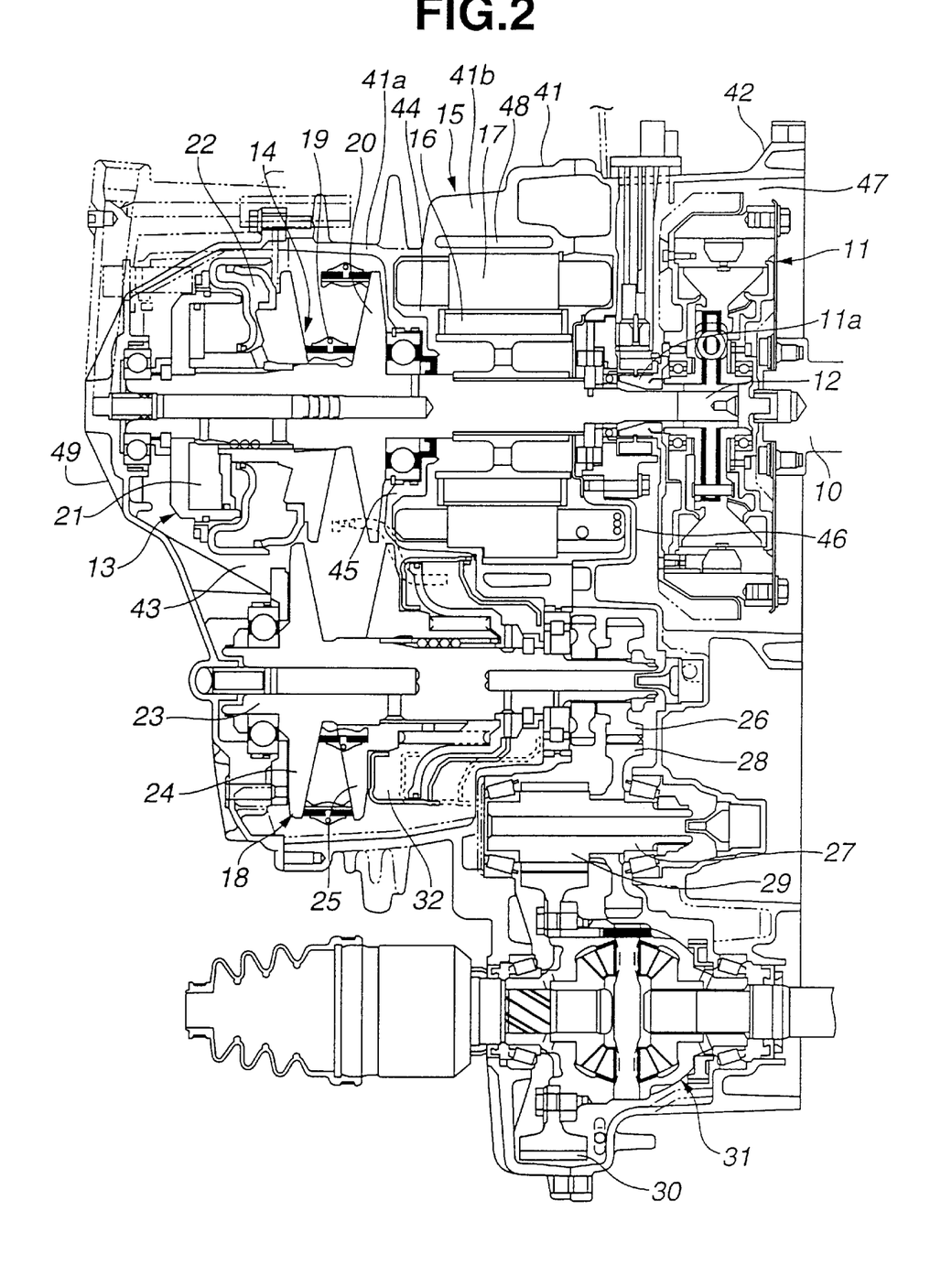
FIG. 2 is a sectional view of a transmission unit having a belt type continuously variable transmission (CVT) in the hybrid drive system of the embodiment.

FIG. 2 shows, in section, the transmission unit 1 having the belt type continuously variable transmission (CVT) 13. In FIG. 2, an engine output shaft 10 is connected with the electromagnetic clutch 11 and an electrode member 11a is provided for supplying power to this electromagnetic clutch 11. The output side of the electromagnetic clutch 11 is connected with a transmission input shaft 12. At the end of the input shaft 12, there is provided a driving pulley 14 of the CVT 13. The A motor 15 for operating the vehicle is disposed axially between the driving pulley 14 and the electromagnetic clutch 11.

The A motor 15 includes a rotor 16 fixed to the input shaft 12 and a stator 17 fixed to the housing. The A motor receives power supply from the battery 5 to drive the input shaft 12. When the vehicle is decelerated, the A motor functions as a generator based on the torque of the input shaft 12.

The CVT 13 includes-the foregoing driving pulley 14, a driven pulley 18, and a belt 19 for transmitting the torque from the driving pulley 14 to the driven pulley 18. The driving pulley 14 includes a fixed conical plate 20 for rotating integrally with the input shaft 12, and an adjustable conical plate 22 disposed opposite the fixed conical plate 20 to form a V-shaped pulley groove. The adjustable conical plate 22 is movable in the axial direction of the input shaft 12 by the hydraulic pressure in a driving pulley cylinder chamber 21. The driven pulley 18 is mounted on a driven shaft 23. The driven pulley 18 includes a fixed conical plate 24 for rotating integrally with the driven shaft 23, and an adjustable conical plate 25 disposed opposite the fixed conical plate 24 to form a V-shaped pulley groove. The adjustable conical plate 25 is movable in the axial direction of the driven shaft 23 by the hydraulic pressure in a driven pulley cylinder chamber 32.

On the driven shaft 23, a driving gear 26 is secured. The driving gear 26 is engaged with an idler gear 28 on an idler shaft 27. A pinion 29 provided on the idler shaft 27 is engaged with a final gear 30. The final gear 30 drives drive shafts leading to drive wheels (not shown) through a differential 31.

The torque inputted from the engine output shaft 10 is transmitted to the CVT 13 through the electromagnetic clutch 11 and the input shaft 12. The torque of the input shaft 12 is transmitted to the differential 31 through the driving pulley 14, the belt 19, the driven pulley 18, the driven shaft 23, the driving gear 26, the idler gear 28, the idler shaft 27, the pinion 29, and the final gear 30.

The thus-constructed transmission can vary the speed ratio between the driving pulley 14 and the driven pulley 18 by moving the adjustable conical plates 22 and 25 of the driving pulley 14 and the driven pulley 18 in the axial direction to vary the contacting radii with the belt 19. The CVT control unit 7e, varies the groove width of the V-shaped pulley groove of each of the driving pulley 14 and the driven pulley 18 by controlling the hydraulic pressure for the driving pulley cylinder chamber 21 or the driven pulley cylinder chamber 32.

The transmission housing is composed of a second housing 41 and a first housing 42 which are placed end to end in the axial direction, and joint together. The second housing 41 has a housing section 41a enclosing the CVT 13 and a housing section 41b enclosing the A motor 15. The first housing 42 encloses the electromagnetic clutch 11. The inside of the second housing 41 is partitioned into a transmission chamber 43 having the CVT 13 therein, and a motor chamber 44 having the A motor 15 therein, by a second partition 45.

The first housing 42 extends axially from a first axial end to which the engine is joined, to a second axial end to which the second housing 41 is joined. The first housing 42 includes a first partition 46 at the second axial end. In the assembled state in which the housings 41 and 42 are joined together, the motor chamber 44 is defined axially between the second partition 45 and the first partition 46. A clutch chamber 47 is defined axially between the first partition 46 and the engine 2 joined to the first axial end of the first housing 42.

The stator 17 of the A motor 15 is fixed in the motor chamber 44 by shrinkage fit to simplify the structure. A water jacket 48 is formed around the stator 17 in the second housing 41 to circulate cooling water for efficient cooling of the A motor 15.

Figure 3:
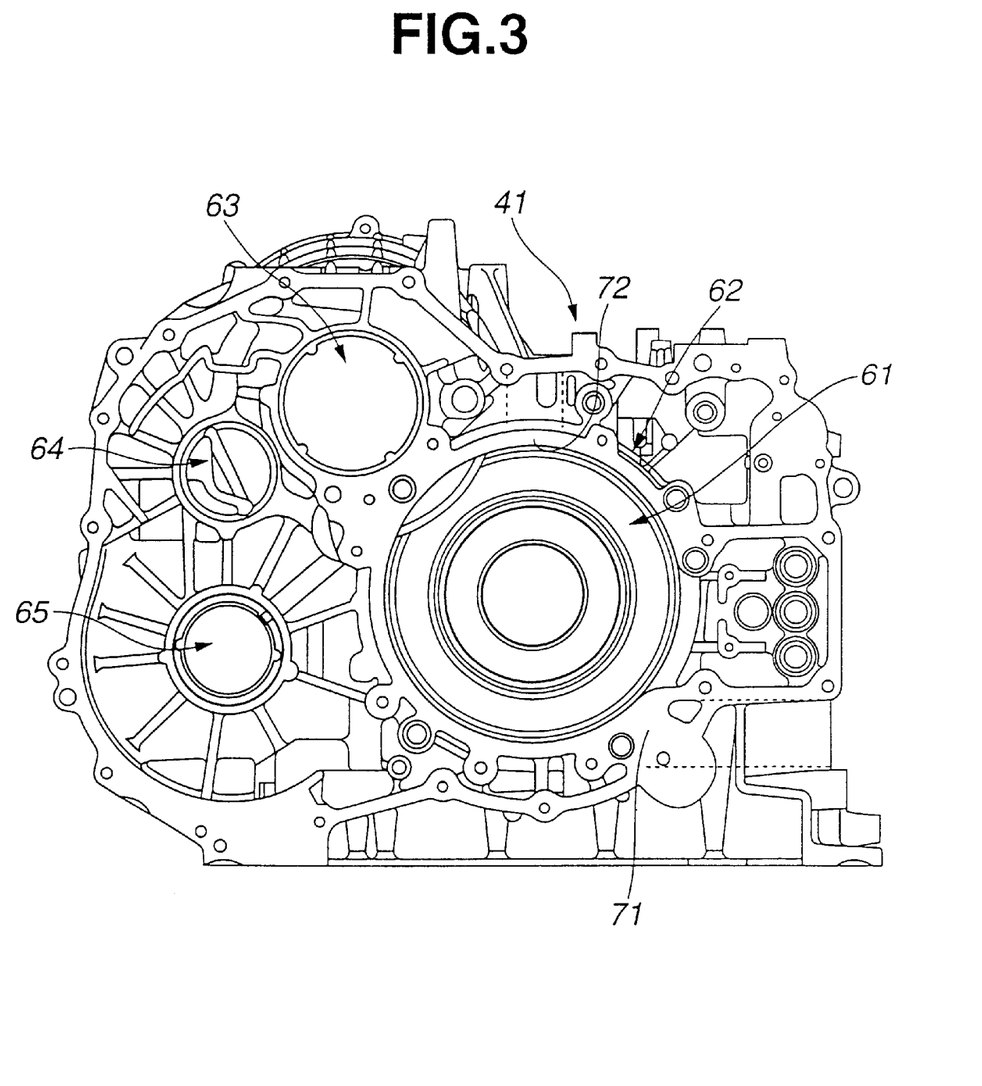
FIG. 3 is a front view of a second housing in the transmission unit of FIG. 2.

FIG. 3 shows the second housing 41, as viewed from the engine's side. In this, example, the water jacket 48 is formed in the section 41b of the second housing 41.

The second housing 41 includes a motor receiving portion 61 for receiving the A motor 15, a driven pulley receiving portion 63 for receiving the driven pulley 18, an idler shaft receiving portion 64 for receiving the idler shaft 27, a differential receiving portion 65 for receiving the differential, and a parking support receiving portion 62 for forming a parking pole support. Reference numerals 71 and 72 denote water inlet and water outlet.

Figure 4:
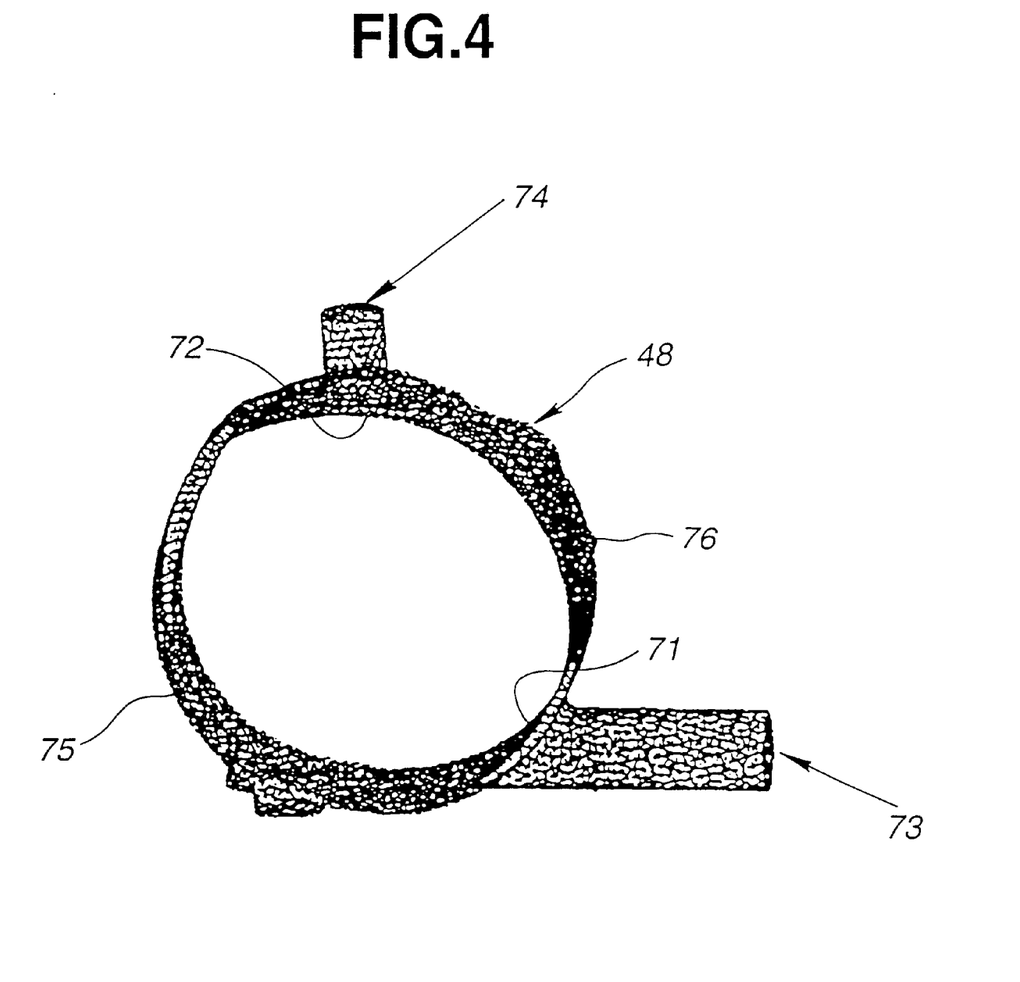
FIG. 4 is a view showing the outline of a water jacket in the transmission unit of FIG. 2.

FIG. 4 shows the contour of the water jacket 48. An inflow passage 73 extends in a tangential direction of the water jacket 48, and an outflow passage 74 extends in a radial direction of the water jacket 48. The water jacket 4 includes an annular passage extending around the motor chamber 44. The annular passage is divided into first and second arc passages 75 and 76. The first arc passage 75 extends from the water inlet 71 to the water outlet 72 in a clockwise direction as viewed in FIG. 4. The second arc passage 76 extends from the water inlet 71 to the water outlet 72 in a counterclockwise direction as viewed in FIG. 4. The first arc passage 75 is longer than the second arc passage 76. The flow direction in the first arc passage 75 near the water inlet 71 is substantially coincident with the flow direction in the inflow passage 73. The flow direction in the second arc passage 76 near the water inlet 71 is approximately perpendicular to the flow direction in the inflow passage 73.

The first and second arc passages 75 and 76 are connected together to form the annular passage extending in a circle. The inflow passage 73 extends along a tangent to the circle. The outflow passage 74 extends in a diametral direction of the circle. The inflow passage 73 is substantially perpendicular to the direction of the outflow passage 74. In this example, the location of the water inlet 71 is away from, but near the diametrically opposite position of the water outlet 72.

In general, a long passage has a greater flow resistance than a short passage. Therefore, in this example, the bend formed at the water inlet 71 between the inflow direction in the inflow passage 73 and the circumferential flow in the first arc passage 75 is made obtuse and nearly straight to reduce energy loss. The bend formed at the water inlet 71 between the inflow direction in the inflow passage 73 and the circumferential flow in the second arc passage 76 is made relatively sharp to increase energy loss. Thus, the water jacket 48 can make the flow resistances of the first arc passage 75 and the second arc passage 76 substantially equal to each other, and thereby hold the flow rate in each of the first and second arc passages 75 and 76 substantially equal to that in the other.

Figure 5:
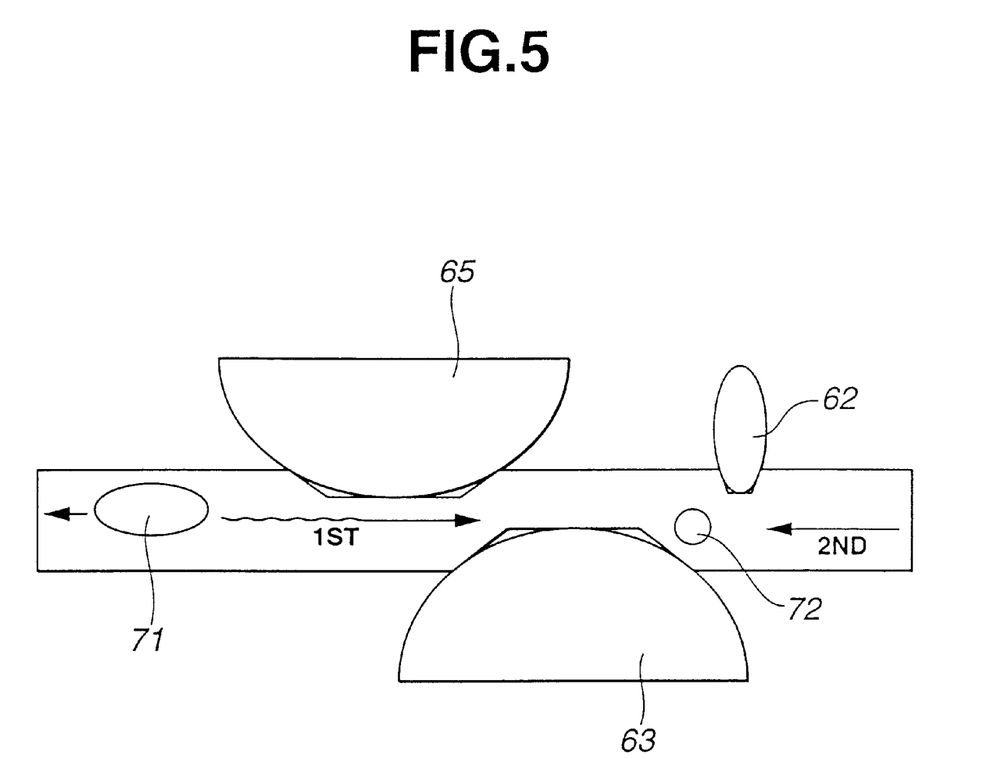
FIG. 5 is a development of the outer periphery of an A motor receiving portion in the transmission unit of FIG. 2.

FIG. 5 shows the water jacket 48 in a developed state. The cross sectional area of the annular passage is uniform while the cross sectional shape of the flow passage is varied to avoid the differential receiving portion 65, the driven pulley receiving portion 63 and the parking support receiving portion 62. This arrangement is advantageous to the flexibility in design and the compactness of the structure. In the example shown in FIG. 5, the first arc passage 75 (1ST) of the water jacket 48 has a depressed portion for the differential receiving portion 65 and a depressed portion for the driven pulley receiving portion 63, and the second arc passage 76 (2ND) has a depressed portion for the parking support receiving portion 62.

Figure 6A:
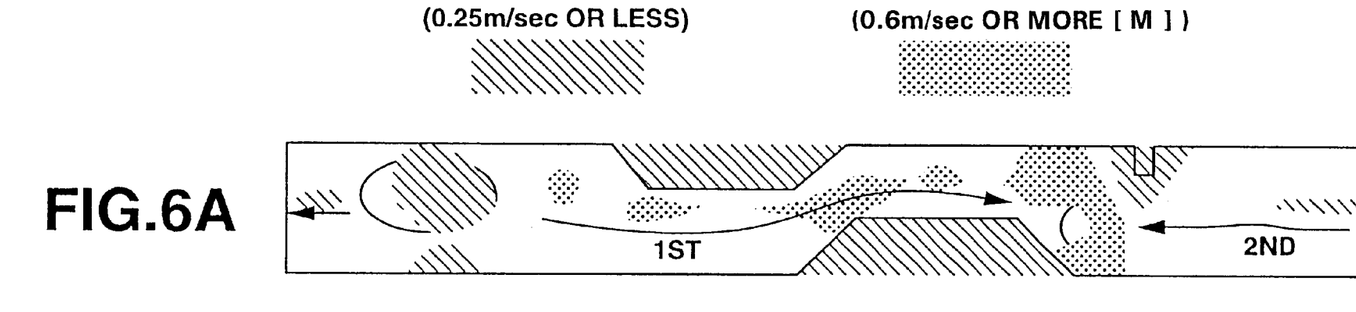
FIGS. 6A~6D are simulation views for illustrating flow rates in water jackets of various shapes.
Figure 6B:
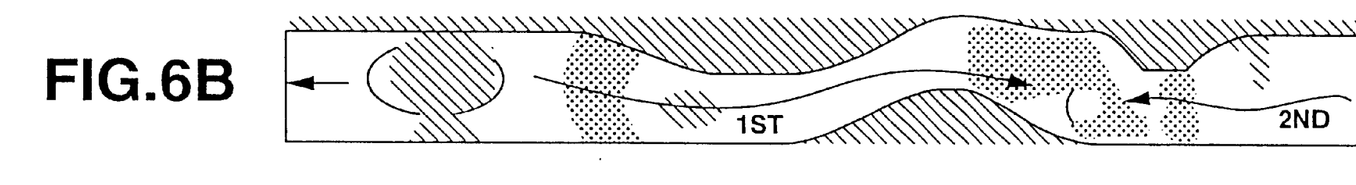
Figure 6C:
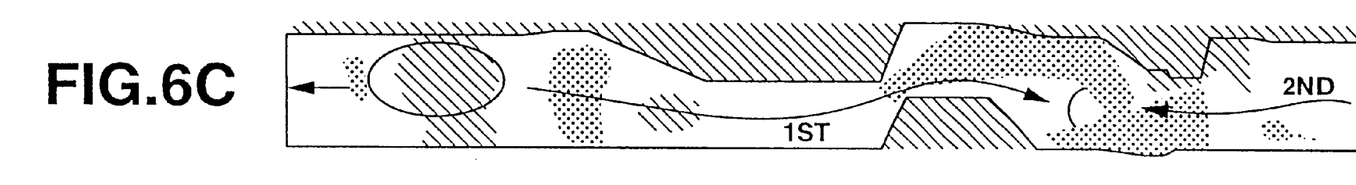

FIGS. 6A, 6B, 6C and 6D show the results of flow velocity simulation in water jackets different in slope and angle of corner of projections in the flow passage formed by the depressed portions. Each figure show a region having a flow velocity of 0.6 (m/sec) or higher (hereinafter referred to as M region). In a first model shown in FIG. 7A, the M region in the first arc passage 75 is narrow in a certain section. This means that the flow rate in the first arc passage 75 is lower than that in the second arc passage 76. Therefore, the water jacket of FIG. 6A is unable to cool the entirety of the A motor 15 evenly. In second and third models shown in FIGS. 6B and 6C, the flow rates in the first and second arc passages 75 and 76 are substantially equal. However, the water jackets FIGS. 6B and 6C are unable to make enough room for the driven pulley receiving portion 63.

Figure 6D:
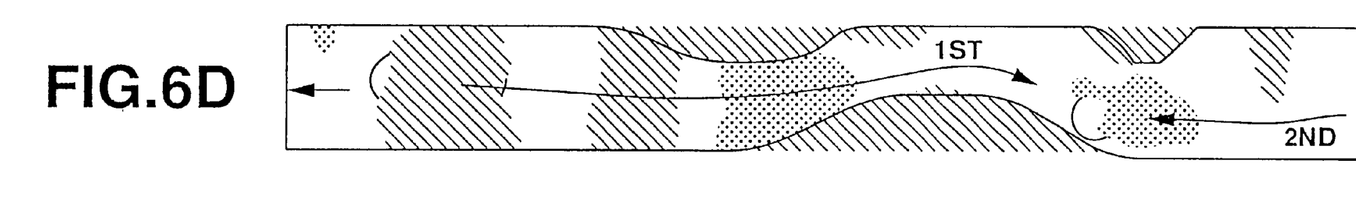

In a fourth model shown in FIG. 6D, the M region appears about equally in both of the first and second arc passages 75 and 76, and the flow rates in both passages are substantially equal. The water jacket of FIG. 6D is able to cool the A motor 15 adequately. This embodiment employs the design of FIG. 6D.

The flow passage resistance is determined by the shape of the passage, and reduced by varying the sectional shape of the passage smoothly. Thus, the water jacket of this embodiment can ensure the flow velocity of flow, and hence the cooling performance.

The water inlet and outlet 71 and 72 are positioned approximately at two diametrically opposite positions so as to confront each other across the A motor 15. The flow in the inflow passage 73 is divided at the inlet 71 into a first circumferential flow through the first arc passage 75 and a second circumferential flow through the second arc passage 76. The first and second arc passages 75 and 76 are so designed as to hold the flow rate in each of the first and second arc passages 7 equal to the flow rate in the other, to achieve stable cooling effect.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to:the following claims.

What is claimed is:

1. A transmission unit for a hybrid vehicle, the transmission unit comprising:
   a unit housing which comprises;
   a first section defining a clutch chamber for containing an electromagnetic clutch;
   a second section defining a transmission chamber for containing a transmission; and
   a third section defining a motor chamber for containing a motor comprising a rotor and a stator, and a water jacket for circulation of water to cool the stator, the water jacket comprising an annular passage extending around the motor chamber, and comprising a water inlet for introducing the water into the annular passage, a water outlet for discharging the water from the annular passage, and a depressed portion which is depressed to form a space for receiving an adjacent component of the transmission unit, and which has a cross sectional shape varied gradually while a flow cross sectional area is held uniform.

2. The transmission unit as claimed in claim 1, wherein the cross sectional shape of the depressed portion is varied along a flow direction in the annular passage so that a ratio of a first dimension to a second dimension of the cross sectional shape is varied gradually in the flow direction.

3. The transmission unit as claimed in claim 2, wherein the first dimension is a dimension in an axial direction and the second dimension is a dimension in a radial direction.

4. The transmission unit claimed in claim 1, wherein the annular passage of the water jacket comprises first and second arc passages extending from the water inlet to the water outlet in two opposite rotational directions around the motor chamber, and the first and second arc passages are so shaped as to hold a quantity of the water reaching the water outlet via the first half passage per unit time and a quantity of the water reaching the water outlet via the second half passage per unit time, approximately equal to each other.

5. The transmission unit claimed in claim 1 wherein the annular passage comprises first and second arc passages extending from the water inlet to the water outlet in two opposite rotational directions around the motor chamber, the first arc passage is longer than the second arc passage, and the first and second arc passages are so designed that a flow resistance in the first arc passage is lower than a flow resistance in the second arc passage.

6. The transmission unit as claimed in claim 5, wherein the water jacket further comprises an inflow passage extending in a tangential direction of the annular passage, to the water inlet.

7. The transmission unit as claimed in claim 6, wherein an angle between a flow direction in the inflow passage and a flow direction in the second arc passage near the water inlet is smaller than an angle between a flow direction in the inflow passage and a flow direction in the first arc passage near the water inlet.

8. The transmission unit as claimed in claim 6, wherein an angle between a flow direction in the inflow passage and a flow direction in the first arc passage near the water inlet is approximately equal to 180°, and an angle between a flow direction in the inflow passage and a flow direction in the second arc passage near the water inlet is approximately equal to 90°.

9. The transmission unit as claimed in claim 6, wherein an angle between a flow direction in the inflow passage and a flow direction in the first arc passage near the water inlet is greater than 90° and equal to or smaller than 180°, and an angle between a flow direction in the inflow passage and a flow direction in the second arc passage near the water inlet is smaller than or equal to 90°.

10. The transmission unit as claimed in claim 6, wherein the water jacket further comprises an outflow passage extending from the water outlet in a radial direction of the annular passage.

* * * * *